(12) United States Patent
Stevens (10) Patent No.: US 12,154,452 B2
(45) Date of Patent: Nov. 26, 2024

(54) HAPTIC AND VISUAL COMMUNICATION SYSTEM FOR THE HEARING IMPAIRED

(71) Applicant: Peter Stevens, Plovdiv (BG)

(72) Inventor: Peter Stevens, Plovdiv (BG)

(73) Assignee: Peter Stevens (BG)

( * ) Notice: Subject to any disclaimer, the term of this patent is extended or adjusted under 35 U.S.C. 154(b) by 217 days.

(21) Appl. No.: 17/409,523

(22) Filed: Aug. 23, 2021

(65) Prior Publication Data

US 2021/0383722 A1 Dec. 9, 2021

Related U.S. Application Data

(63) Continuation-in-part of application No. 16/354,033, filed on Mar. 14, 2019, now Pat. No. 11,100,814.

(51) Int. Cl.
*G09B 21/00* (2006.01)
*G10L 15/06* (2013.01)
(Continued)

(52) U.S. Cl.
CPC .......... *G09B 21/009* (2013.01); *G10L 15/063* (2013.01); *G10L 21/16* (2013.01); *G10L 21/18* (2013.01); *G10L 2015/0638* (2013.01)

(58) Field of Classification Search
CPC ....... G10L 15/08; G10L 21/16; G10L 15/075; G10L 15/22; G10L 17/24; G10L 21/00; G10L 21/06; G10L 25/51; G10L 15/063; G10L 2015/0638; G09B 19/04; G09B 21/009; G09B 5/02; H04W 4/021; H04W 4/029; H04W 84/18; H04N 23/51;
(Continued)

(56) References Cited

U.S. PATENT DOCUMENTS 3,920,903 A 11/1975 Beller
4,260,229 A 4/1981 Bloomstein
(Continued)

OTHER PUBLICATIONS

Caporusso, N., et al., "A Wearable Device Supporting Multiple Touch-and-Gesture-Based Languages for the Deaf-Blind," in: International Conference on Applied Human Factors and Ergonomics, Jun. 2018, <https://www.researchgate.net/profile/Nicholas_Caporusso3/publication/318180691_A_Wearable_Device_Supporting_Multiple_Touch-_and_Gesture-Based_Languages_for_the_Deaf-Blind/links/5be3affd585150b2ba6d3b1/A_Wearable_Device_Supporting_Multiple_Touch-_and_Gesture-Based_Languages_for_the_Deaf-Blind.pdf>.
(Continued)

*Primary Examiner* — Dionne Pendleton
(74) *Attorney, Agent, or Firm* — FOLEY & LARDNER LLP (57) ABSTRACT

A communication method for hearing impaired communication comprising: providing a speech training device to a hearing impaired user, the speech training device configured to teach the hearing impaired user how to determine non-speech sounds. The method further includes providing a haptic output device to a hearing impaired user where the haptic output device is configured to be relasably coupled to the hearing impaired user. The haptic output device receives, a sound input signal comprising a non-speech sound and provides the haptic output signal to an actuator which is in electrical communication with the haptic output device. The actuator actuates in response to the haptic output signal and provides a haptic sensation to the hearing impaired user.

5 Claims, 5 Drawing Sheets

(51) Int. Cl.
*G10L 21/16* (2013.01)
*G10L 21/18* (2013.01)

(58) Field of Classification Search
CPC ........ H04N 23/54; H04N 23/55; H04N 23/56; H04N 7/183; H04N 7/188; G08B 13/08; G08B 23/00; G07G 1/00; G07G 1/01; G07B 15/04; G06V 20/52; G06V 2201/05; G06V 40/00; G06V 40/16; G06V 40/172; G06T 1/00; G01S 13/887; G06K 19/06028; E06B 11/022; E06B 11/085; A01K 1/0017; A01K 11/006; E05G 5/003; E05F 15/73; E05F 15/78; E05F 15/79; G07C 9/10; G07C 9/27; G07C 9/37; G07C 9/15; G07C 9/00944; G07C 9/20; G07C 9/253; G07C 1/00; G07C 2209/08; G07C 2209/63; G07C 2209/64; G07C 9/00; G07C 9/00563; G07C 9/257; G07C 9/28; G07C 9/30; G07C 9/32; G07C 9/38

See application file for complete search history.

(56) References Cited

U.S. PATENT DOCUMENTS

| | | | |
|---|---|---|---|
| 6,292,775 B1 * | 9/2001 | Holmes | G10L 15/10 |
| | | | 704/256.1 |
| 6,675,145 B1 | 1/2004 | Yehia et al. | |
| 8,494,497 B2 | 7/2013 | Seo et al. | |
| 9,754,464 B1 | 9/2017 | Sinkov | |
| 10,388,272 B1 * | 8/2019 | Thomson | G10L 15/22 |
| 11,159,932 B1 * | 10/2021 | Meyer | G06F 3/016 |
| 2001/0041330 A1 | 11/2001 | Brown et al. | |
| 2002/0161582 A1 | 10/2002 | Basson et al. | |
| 2004/0243416 A1 | 12/2004 | Gardos | |
| 2009/0070108 A1 | 3/2009 | Yen et al. | |
| 2009/0138270 A1 | 5/2009 | Fletcher et al. | |
| 2011/0187498 A1 | 8/2011 | Flaherty et al. | |
| 2015/0070148 A1 | 3/2015 | Cruz-Hernandez et al. | |
| 2015/0133716 A1 | 5/2015 | Suhami et al. | |
| 2016/0042666 A1 | 2/2016 | Hughes | |
| 2017/0243582 A1 | 8/2017 | Menezes et al. | |
| 2017/0303052 A1 * | 10/2017 | Kakareka | G01S 3/86 |
| 2018/0204568 A1 | 7/2018 | Ginsberg | |
| 2018/0233163 A1 * | 8/2018 | Eagleman | G10L 21/16 |
| 2018/0254038 A1 | 9/2018 | Kawano et al. | |
| 2018/0288519 A1 | 10/2018 | Min | |
| 2020/0294421 A1 | 9/2020 | Stevens | |
| 2023/0128926 A1 * | 4/2023 | Balagurunath | G06F 3/03542 |
| | | | 434/114 |
| 2023/0326368 A1 * | 10/2023 | Kneisel | G06F 3/0346 |
| | | | 715/702 |

OTHER PUBLICATIONS

Cardona, et al., "A Wearable Captioning Device for the Hearing Impaired," retrieved from https://www.core77.com/projects/55969/A-Wearable-Captioning-Device-for-the-Hearing-Impaired, 15 pages (2017).

International Search Report & Written Opinion for PCT/US2020/022469 dated Jul. 16, 2020, 12 pages.

International Search Report & Written Opinion for PCT/US2022/041064 dated Jan. 17, 2023, 12 pages.

* cited by examiner

HAPTIC AND VISUAL COMMUNICATION SYSTEM FOR THE HEARING IMPAIRED

CROSS-REFERENCE TO RELATED PATENT

This application is a continuation in part of U.S. patent application Ser. No. 16/354,033, now U.S. Pat. No. 11,100, 814, filed on Mar. 14, 2019, the contents of which are incorporated herein by reference in their entirety.

TECHNICAL FIELD

The present invention relates to communication systems. More particularly, the present invention relates to communication systems for use by the hearing impaired that can be implemented non-surgically.

BACKGROUND

The hearing impaired population has traditionally had difficulty communicating with the general population that is able to hear. To communicate amongst the hearing impaired population, sign language was invented such that the hearing impaired population does not need to read lips or attempt to speak to carry on a conversation with another person that knows sign language. However, the majority of the general population does not know or understand sign language, so the difficulty for a hearing impaired person to communicate with a hearing person remains.

Recent technological advances have aimed to provide devices that allow the hearing impaired population to hear and eliminate the need for sign language. One such device is a cochlear implant, which is an electronic device that partially restores hearing and can be a viable option for those who are unable to hear due to inner ear damage. A cochlear implant operates by bypassing the auditory mechanisms of the ear and feeding a sound signal directly to the auditory nerve. While a cochlear implant may provide benefits for some of the hearing impaired population, a cochlear implant can be prohibitively expensive (e.g., $30,000-$50,000) and the subject must undergo a surgical procedure to implant the device. Currently, there are few non-surgical options for improving communications with the hearing population. For example, lip reading, sign language, cued speech, fingerspelling, etc. However, the non-surgical options do not provide the hearing impaired person with the ability to communicate effectively with a hearing person.

SUMMARY

A communication method for hearing impaired communication comprising: providing a speech training device to a hearing impaired user, the speech training device configured to teach the hearing impaired user how to determine non-speech sounds. The method further includes providing a haptic output device to a hearing impaired user where the haptic output device is configured to be relasably coupled to the hearing impaired user. The haptic output device receives, a sound input signal comprising a non-speech sound and provides the haptic output signal to an actuator which is in electrical communication with the haptic output device. The actuator actuates in response to the haptic output signal and provides a haptic sensation to the hearing impaired user.

A haptic device for hearing impaired communication comprises one or more memory devices configured to store instructions that, when executed on one or more processors, cause the one or more processors to: receive a sound as a sound input, determine a physical property of the sound input, generate a haptic output signal based on the physical property of the sound input, and actuate an actuator, the actuator configured to receive the haptic output signal and provide haptic sensations based on the haptic output signal to a user wearing the haptic output device.

A speech training device for hearing impaired communication comprises of one or more memory devices configured to store instructions that, when executed on one or more processors, cause the one or more processors to: receive a sound input comprising of a plurality of human speeches and a plurality of non-human speeches, decode a sound input signal from the sound input where the decoding comprises separating a single human speech from the plurality of human speeches and the plurality of non-human speeches, and store the separated single human speech on the one or more memory devices by the one or more processors.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings. Exemplary embodiments of the present application will now be described, way of example only, with reference to the accompanying drawings, which are not necessarily drawn to scale, and wherein:

DETAILED DESCRIPTION

Overview

Referring generally to the Figures, a system and method are shown to provide for communication between a hearing person and a hearing impaired person. As described herein, a hearing person is a person that can hear sounds with or without a hearing aid. Typically, a hearing person can hear sounds in the range of −10 to 90 hearing levels in decibels (dBHL), which means that sounds in that range can be detected at least 50% of the time. A hearing impaired person is a person that cannot hear sounds softer than 90 dBHL even when wearing a hearing aid. According to various embodiments, a haptic output device is worn by a hearing impaired person to provide for communicating with a hearing person or another hearing impaired person. The haptic output device is configured to receive a speech input signal based on speech from the hearing person and convert the speech input signal to a haptic output signal. The haptic output signal is configured to communicate with an actuator coupled to the haptic output device. The actuator provides the hearing impaired person with haptic sensations that correspond to the speech input signal received by the haptic output device. Based on the haptic sensations, the hearing impaired person is able to understand the speech from the hearing person.

According to other embodiments, a speech training device is used by a hearing impaired person to learn how to enunciate sounds and words. The speech training device is configured to provide the hearing impaired person with guidance on the proper tongue and jaw placement to create sounds corresponding to speech. The speech training device receives a speech input signal from the hearing impaired person based on the attempts of the hearing impaired person to create speech sounds. The speech training device analyzes the speech of the hearing impaired person by comparing the speech input signal or speech sounds to model speech spoken by a hearing person and determines whether the speech needs to be corrected. As used herein, the term "model speech" refers to speech sounds created by a hearing person that exhibits proper enunciation of words and sounds. If the speech needs to be corrected, the speech training device provides visual cues to the hearing impaired person such that the hearing impaired person can practice speech sounds until the speech sounds are substantially similar to the model speech.

According to other embodiments, a hearing impaired person is capable of communicating with a hearing person without the use of traditional assistive technology (e.g., hearing aids, cochlear implants, or other assistive technologies). A hearing impaired person that has successfully learned to speak by using the speech training device wears the haptic output device instead of the traditional assistive technology. Accordingly, the hearing impaired person can understand spoken words based on the haptic sensations provided by the haptic output device. The hearing impaired person can effectively communicate with a hearing person because the hearing impaired person can both understand spoken words and speak with the appropriate enunciation.

Haptic Output Device

Figure 1:
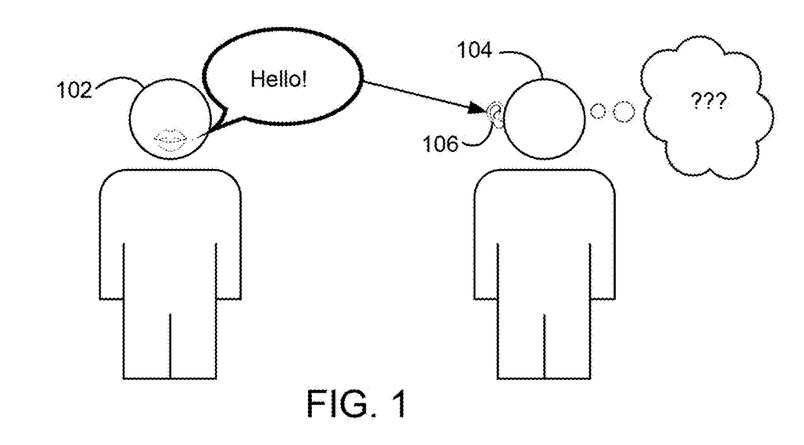
FIG. 1 is an illustration of a hearing person attempting to communicate with a hearing impaired person.

FIG. 1 is an illustration of a hearing person 102 attempting to communicate with a hearing impaired person 104. When the hearing person 102 greets the hearing impaired person 104, the sound from the hearing person 102 reaches the ear 106 of the hearing impaired person 104, but because the hearing impaired person cannot hear, the greeting by the hearing person 102 cannot be processed by the brain of the hearing impaired person 104. As such, the hearing impaired person 104 cannot understand what the hearing person 102 is saying.

Figure 2:
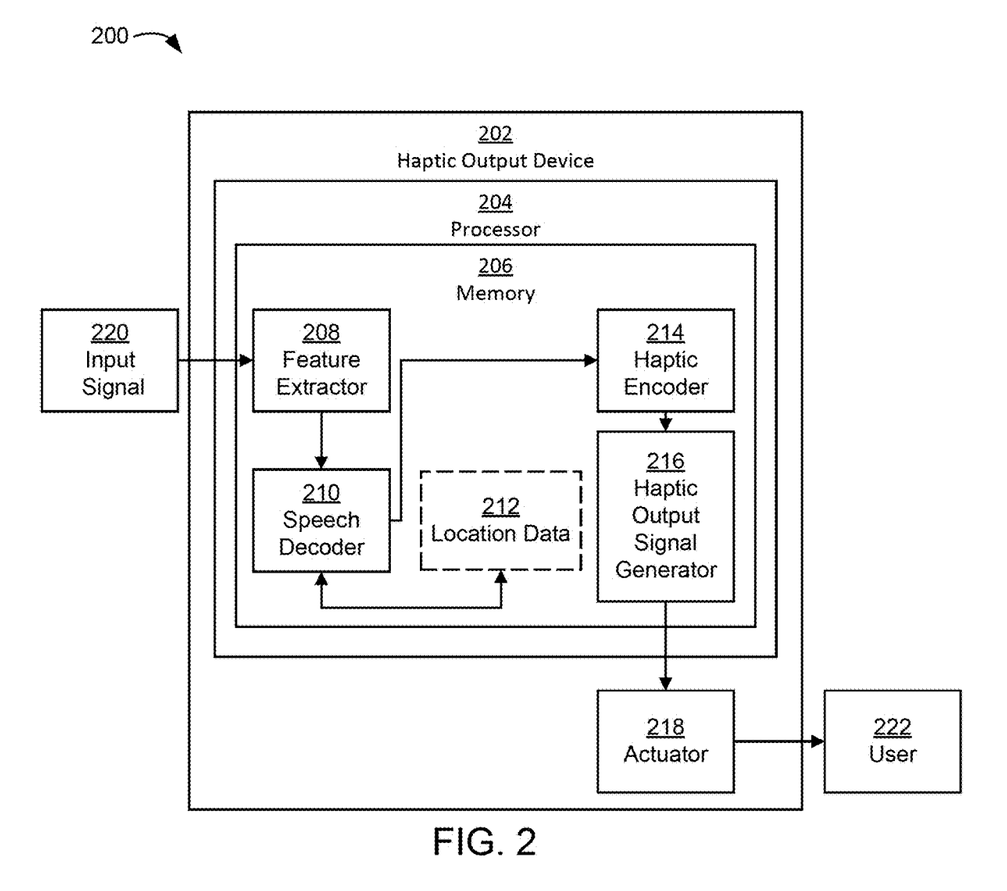
FIG. 2 is a block diagram of a communication system, according to a particular embodiment.

FIG. 2, is a block diagram of a communication system 200, according to a particular embodiment. The communication system 200 includes a haptic output device 202, a processor 204, a memory 206, an input signal 220, and a user 222. The memory 206 includes a feature extractor 208, a speech decoder 210, a haptic encoder 214, a haptic output signal generator 216, and an actuator 218.

The haptic output device 202 is an apparatus the user 222 can wear on a body part (e.g., on an arm, leg, wrist, etc.) that is configured to provide haptic sensations to the user 222 when the user 222 is wearing it. The haptic output device 202 can be worn by the user 222 in a wide variety of ways to maintain contact between the actuator 218 and the skin of the user 222. For example, contact can be maintained by a hook-and-loop coupling, adhesive coupling, elastic coupling, and other couplings.

The processor 204 can be a general purpose or specific purpose processor, an application specific integrated circuit (ASIC), one or more field programmable gate arrays (FPGAs), a group of processing components, or other suitable processing components. The processor 204 is configured to execute computer code or instructions stored in the memory 206 or received from other computer readable media (e.g., CDROM, network storage, a remote server, etc.).

The memory 206 can include one or more devices (e.g., memory units, memory devices, storage devices, etc.) for storing data and/or computer code for completing and/or facilitating the various processes described in the present disclosure. The memory 206 can include random access memory (RAM), read-only memory (ROM), hard drive storage, temporary storage, non-volatile memory, flash memory, optical memory, or any other suitable memory for storing software objects and/or computer instructions. The memory 206 can include database components, object code components, script components, or any other type of information structure for supporting the various activities and information structures described in the present disclosure. The memory 206 can be communicably connected to the processor 204 and can include computer code for executing (e.g., by the processor 204) one or more processes described herein. When the processor 204 executes instructions stored in the memory 206, the processor 204 generally configures the haptic output device 202 to complete such activities.

The input signal 220 can be any sound generated near the haptic output device 202 such that the input signal 220 can be received by the feature extractor 208. Non-limiting examples of the input signal 220 include human speech, human emotional sounds (e.g., laughing, crying, yelling, or other emotional sounds), animal sounds, traffic sounds (e.g., a horn honking, screeching brakes, or other traffic sounds), and sounds that may require an immediate response or special attention (e.g., sirens, gunshots, collapsing buildings, or other such sounds).

The feature extractor 208 is configured to receive the input signal 220 and differentiate between the sounds received. For example, the feature extractor 208 may receive a combination of sounds including human speech, a dog barking, and a car horn honking. The feature extractor 208 identifies associated sounds and provides the sound signals to the speech decoder 210 for further analysis. In some embodiments, the feature extractor 208 provides only the human speech sounds to the speech decoder 210. In other embodiments, the feature extractor 208 provides all sounds to the speech decoder 210 in different categories (e.g., human speech, human emotion, traffic sounds, or other identifier categories). The feature extractor 208 accomplishes this by using a wide variety of known techniques to convert sound waves to the corresponding digital representations. Non-limiting examples of such techniques include mel-frequency cepstral coefficients (MFCC), wavelet, perceptual linear prediction (PLP), etc.

The speech decoder 210 is configured to receive the sound signals from the feature extractor 208 and determine what the sound signals represent. For example, the speech decoder 210 can determine the words represented by the speech sound signals and the traffic sounds represented by the traffic sound signals. The speech decoder 210 identifies the source and type of the sound signals by comparing the sounds signals to known sound models. For example, the traffic sound signals are compared to known traffic sound models (e.g., car horns, sirens, screeching brakes, etc.) to determine the sounds most likely represented by the traffic sound signal. As another example, the speech sound signals are compared to known language models (e.g., English, Spanish, Russian, etc.) to determine the words most likely represented by the speech sound signals. Additionally, the speech decoder 210 may include other analyses such as an accent analysis. For example, the speech sound signals may indicate that the speaker is speaking English, however the speaker is speaking with an Irish accent. The speech decoder 210 can differentiate between accents within the same language to determine the words most likely represented by the speech sound signals. Furthermore, the speech decoder 210 can determine whether a word spoken using one lexicon is equivalent to a word spoken using a different lexicon. For example, if the speech decoder 210 determines that the speaker is British but is programmed to decode words into American English, the speech decoder may decode the word "football" spoken by the British speaker as the word "soccer" in American English.

The haptic encoder 214 is configured to receive the decoded sounds from the speech decoder 210 and encode the decoded sounds using a haptic algorithm. In one embodiment, the decoded sounds can be encoded by the haptic encoder 214 using an American Standard Code for Information Interchange (ASCII) system. The ASCII system translates letters and numbers into combinations of 7 binary bits such that each letter and number is represented by a unique combination of 7 bits. For example, the letter "n" in the ASCII system is represented by the binary combination "110 1110."

In other embodiments, the decoded speech can be encoded using a similar system but with fewer bits than the ASCII system (which provides for 128 characters), as the ASCII system accounts for capital letters and other control characters that can be omitted. For example, a binary system incorporating 6 bits provides for 64 characters. Because most languages have fewer than 35 letters in their alphabets, 64 characters may be sufficient to account for letters, numbers, and other sounds that must be provided to the hearing impaired person. For example, a car horn may be encoded as a specific combination of letters or letters and numbers (e.g., "acegij") that are meaningless to a hearing person. When a hearing impaired person perceives the "word" for the car horn (e.g., "acegij") represented by haptic sensations, the hearing impaired person knows to look around because a car is honking. Additionally, sounds like laughter, crying, etc. can be encoded in a similar fashion such that a hearing impaired person can fully perceive his or her surroundings.

In some arrangements, the haptic encoder 214 can encode the decoded speech by using a code like Morse Code such that, instead of combinations of bits, letters and numbers are represented by combinations of short and long haptic signals. For example, the letter "o" in Morse Code is represented by "---."

In some implementations, the haptic encoder 214 can encode the decoded speech by using an alternative binary code designed specifically for the haptic output device 202. The alternative binary code can be designed for maximum efficiency to eliminate unnecessary components included in an ASCII-type system. For example, the alternative binary code may eliminate the distinction between capital and lowercase letters. As another example, the alternative binary code may eliminate seldom used punctuation such as semicolons or backward slashes. By eliminating unnecessary components, some permutations of the alternative binary code will not be assigned to a sound, providing the ability to assign sounds to the code in the future as desired.

The haptic output signal generator 216 is configured to receive the encoded haptic words and sounds and create a haptic output signal based on the encoded haptic words and sounds to be sent to the actuator 218. For example, the haptic output signal generator 216 may receive the encoded haptic word "hi." The haptic output signal generator 216 can create a haptic output signal to cause the actuator 218 to deliver a haptic sensation to the user that the user would understand as "hi." Using the 6-bit system as an example, the haptic output signal generator 216 can create the 6-bit signal "100001 100010" to provide to the actuator 218.

The actuator 218 is configured to receive the haptic output signal from the haptic output signal generator 216 and provide haptic sensations to a user 222. The actuator 218 can be a wide variety of devices or systems that can provide a haptic sensation. In some embodiments, the haptic sensation is a vibratory sensation. In other embodiments, the haptic sensation is an electrical sensation (e.g., a very low voltage). Non-limiting examples of the actuator 218 include an eccentric rotating mass (ERM), a linear resonant actuator (LRA), piezoelectrics, etc. The actuator 218 is coupled to and positioned along the haptic output device 202 such that the actuator 218 will create a haptic sensation for the user. In some embodiments, the actuator 218 may include a set of substantially similar actuators 218. For example, if the decoded speech is based on a 6-bit system, 6 actuators 218 are positioned in the haptic output device 202 with sufficient spacing such that a user can distinguish between the sensation provided by each actuator 218 separately. Accordingly, the user can also distinguish between groups of the actuators 218 that are activated at the same time such that the user can understand what letter, number, or other sound is being represented by the haptic sensations provided. In other embodiments, the actuator 218 is a single actuator. For example, if the decoded speech is based on Morse Code, a single actuator 218 is required to provide the haptic sensations that correspond to Morse Code.

In some arrangements, the user has the option to increase the speed of the transmission from the haptic output device 202 to the user. As described, the haptic output device 202 provides haptic sensations to the user that represent the letters of the words being spoken. As such, the user understands the words being spoken letter-by-letter. However, to increase the speed by which the spoken words are provided to the hearing impaired user by haptic sensations, the haptic output device 202 can provide haptic sensations based on phonetic translations instead of letter-based translations. For example, when translating the word "what" letter-by-letter, the hearing impaired user receives four haptic sensations, with each haptic sensation corresponding to a letter of the word "what." However, providing haptic sensations based on the phonetic sound of "what" can reduce the number of haptic sensations provided to the user. For example, the haptic output device can provide three haptic sensations corresponding to "wut," because when pronounced phonetically, "wut" sounds like "what." As such, the haptic output device 202 can provide fewer haptic sensations to the hearing impaired user when providing phonetic transmissions, thus increasing the speed of the transmissions.

Figure 3:
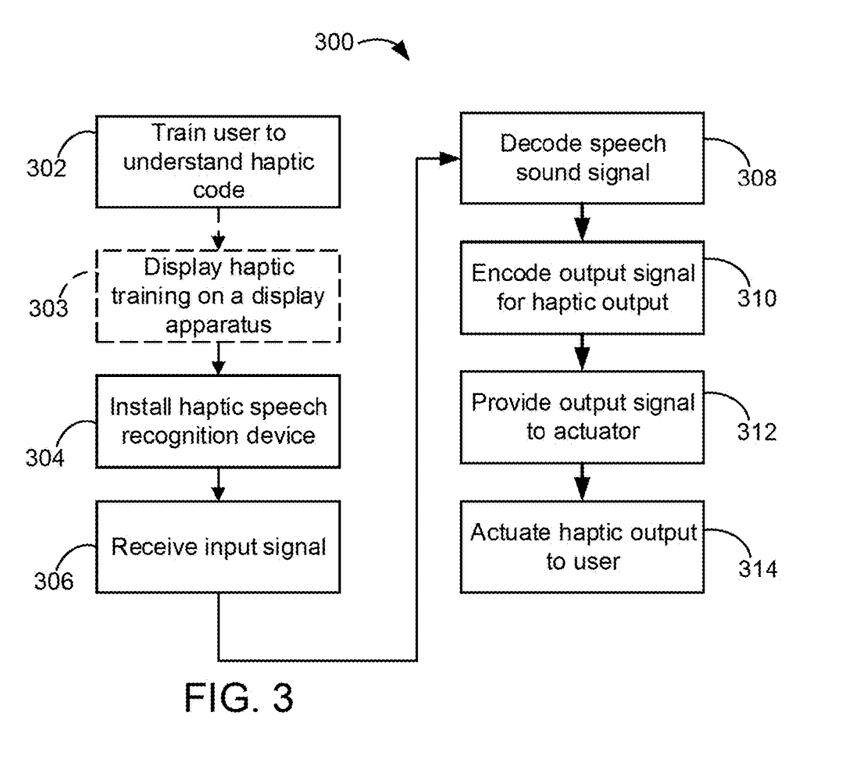
FIG. 3 is flow diagram of a method of providing haptic output to a hearing impaired user, according to a particular embodiment.

FIG. 3 is flow diagram of a method 300 of providing haptic output to a hearing impaired user, according to a particular embodiment. The method 300 can be carried out, in part, by the processor 204 of the haptic output device of FIG. 2.

At 302, a user is trained to understand the haptic code. Prior to communicating by using the haptic output device 202, the user must become fluent in the haptic language provided by the haptic output device 202. Accordingly, the user must undergo some training such that the user can understand the haptic sensations. In one embodiment, the training can include a classroom-based training, where the user wears the haptic output device 202 and learns to understand the haptic words in a classroom setting. In another embodiment, at 303, the training can include an application-based training, where the haptic output device 202 works in conjunction with an application on a smartphone such that the user can learn how to interpret the haptic sensations provided by the haptic output device 202.

At 304, a haptic speech recognition device is installed. For example, after completing training with a training haptic output device 202, the user is provided with a new haptic output device 202 for use. The user can then install the haptic output device 202 in the desired body location (e.g., the upper arm, wrist, shoulder, etc.) such that the haptic output device 202 can receive input signals 220 and the actuator 218 is in contact with the user 222 such that the user can feel the haptic sensations provided by the actuator 218.

At 306, an input signal is received. The feature extractor 208 separates the speech signals from the non-speech signals. For example, the input signal 220 may include words and a dog barking, and the feature extractor 208 can categorize the two sounds differently for further processing.

At 308, the input signal is decoded. The feature extractor 208 provides the sound signals to the speech decoder 210 such that the speech decoder 210 can determine what words the speaker was using, along with any other noises. For example, the speech decoder 210 may decode both the words spoken by the speaker and the barking noise.

At 310, a haptic output signal is encoded. As described, the haptic encoder 214 translates the words and sounds into haptic language based on the haptic algorithm being used (e.g., 6-bit encoding, Morse Code, etc.).

At 312, the haptic output signal is provided to the actuator. The haptic output signal generator 216 receives the encoded haptic words and/or sounds from the haptic encoder 214 and generates a haptic signal based on the encoded words and/or sounds.

At 314, the haptic output is actuated to a user. For example, the actuator 218 receives the haptic signal from the haptic output signal generator 216 and provides haptic sensations to the user 222 based on the haptic signal.

Figure 4:
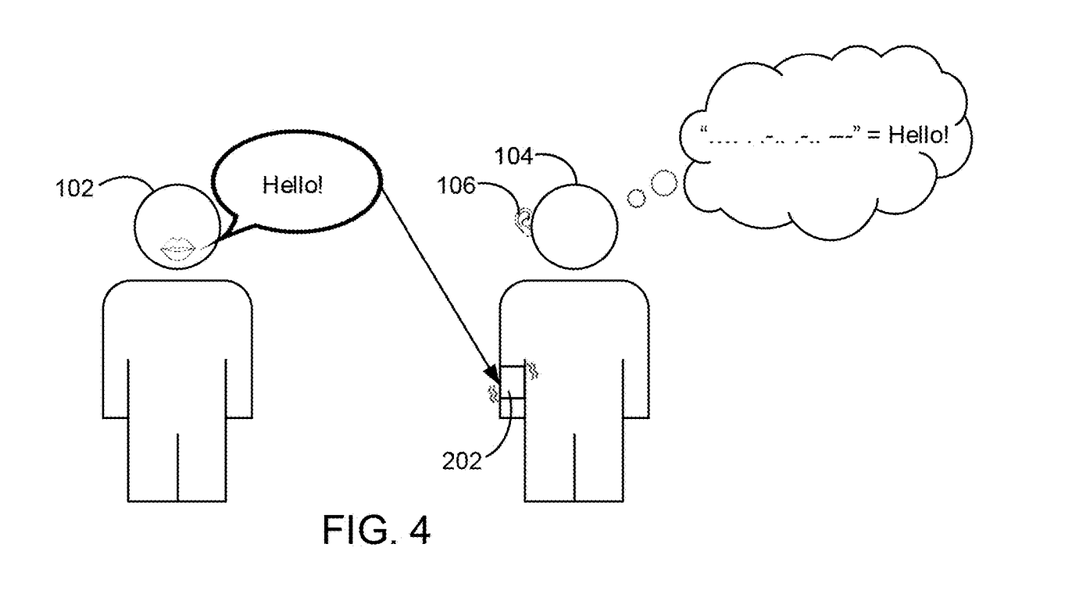
FIG. 4 is an illustration of a hearing person attempting to communicate with a hearing impaired person using the haptic output device of FIG. 2.

FIG. 4 is an illustration of a hearing person attempting to communicate with a hearing impaired person using the haptic output device 202 of FIG. 2. FIG. 4 is similar to FIG. 1, however in FIG. 4 the hearing impaired person is wearing the haptic output device 202. When the hearing person 102 greets the hearing impaired person 104, the haptic output device 202 translates the greeting into a haptic output as described above. Accordingly, the hearing impaired person 104 can understand the hearing person 102 based on the haptic sensations provided to the hearing impaired person 104 by the haptic output device 202.

Speech Training System

Figure 5:
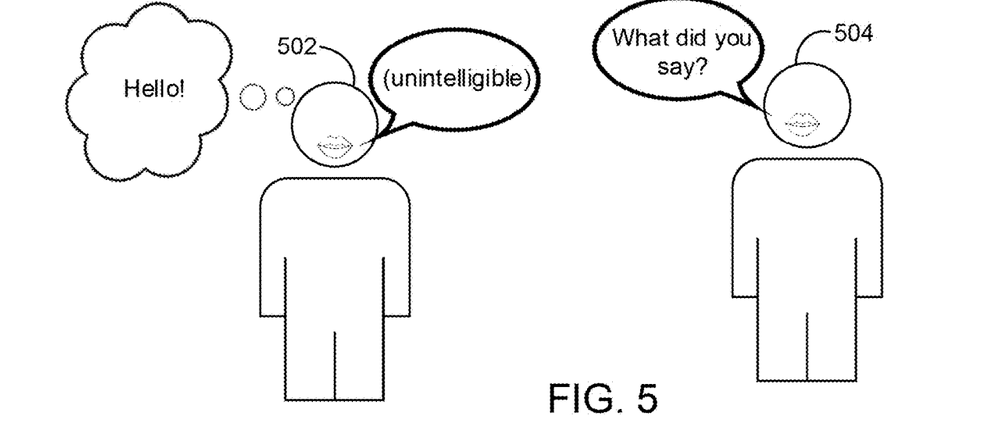
FIG. 5 is an illustration of a hearing impaired person attempting to communicate with a hearing person.

FIG. 5 is an illustration of a hearing impaired person 502 attempting to communicate with a hearing person 504. In other embodiments, the hearing impaired person 502 may attempt to communicate with another hearing impaired person. When the hearing impaired person 502 greets the hearing person 504, the hearing person 504 cannot understand the hearing impaired person 502 because the hearing impaired person 502 cannot properly enunciate words such that the hearing person 504 can understand.

Figure 6:
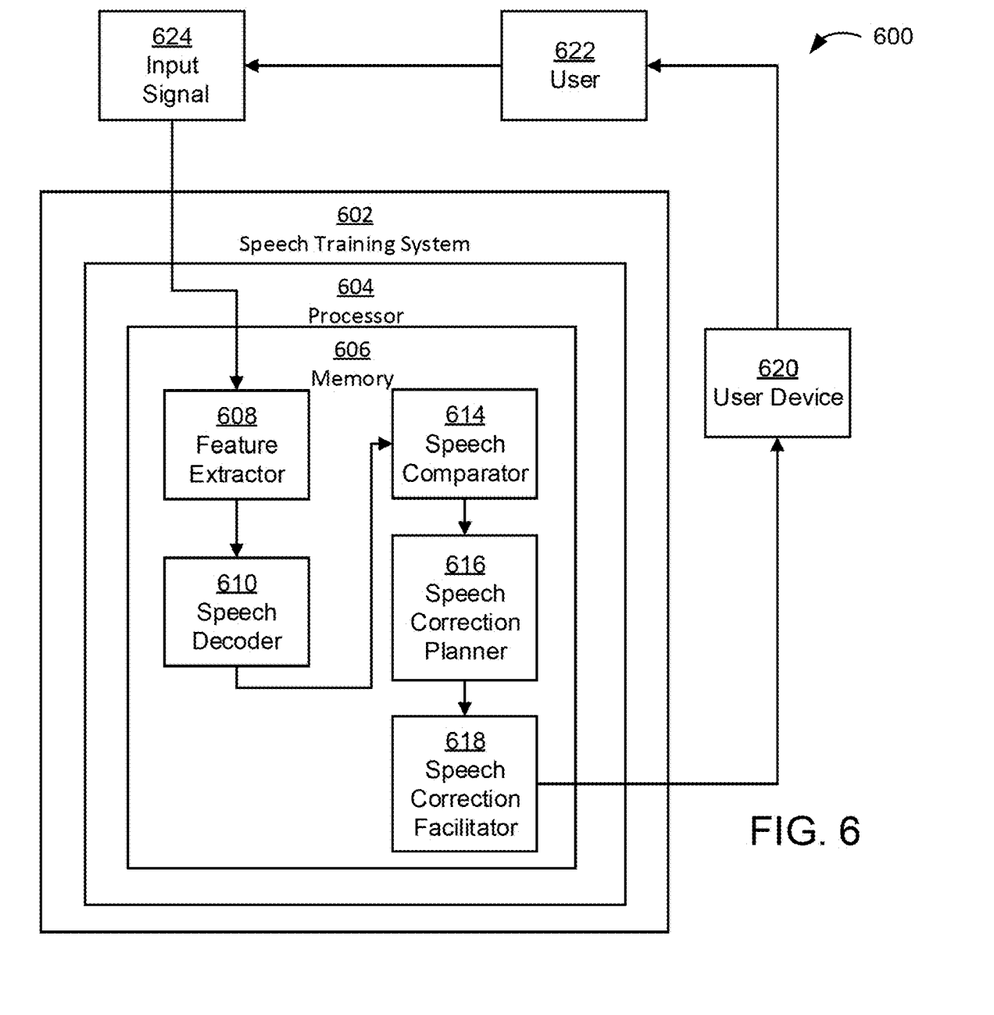
FIG. 6 is a block diagram of another communication system, according to a particular embodiment.

FIG. 6 is a diagram of a communication system 600, according to a particular embodiment. The communication system 600 includes a speech training system 602, a processor 604, a memory 606, an input signal 624, a user device 620, and a user 622. The memory 606 further includes a feature extractor 608, a speech decoder 610, a speech comparator 614, a speech correction planner 616, and a speech correction facilitator 618.

The speech training system 602 is configured to teach a hearing impaired person how to properly enunciate words such that the hearing impaired person can communicate by speaking. As shown, the speech training system 602 is a separate component from the user device 620, however in other embodiments the speech training system 602 can be integrated within the user device 620.

The processor 604 can be a general purpose or specific purpose processor, an application specific integrated circuit (ASIC), one or more field programmable gate arrays (FPGAs), a group of processing components, or other suitable processing components. The processor 604 is configured to execute computer code or instructions stored in the memory 606 or received from other computer readable media (e.g., CDROM, network storage, a remote server, etc.).

The memory 606 can include one or more devices (e.g., memory units, memory devices, storage devices, etc.) for storing data and/or computer code for completing and/or facilitating the various processes described in the present disclosure. The memory 606 can include random access memory (RAM), read-only memory (ROM), hard drive storage, temporary storage, non-volatile memory, flash memory, optical memory, or any other suitable memory for storing software objects and/or computer instructions. The memory 606 can include database components, object code components, script components, or any other type of information structure for supporting the various activities and information structures described in the present disclosure. The memory 606 can be communicably connected to the processor 604 and can include computer code for executing (e.g., by the processor 604) one or more processes described herein. When the processor 604 executes instructions stored in the memory 606, the processor 604 generally configures the speech training system 602 to complete such activities.

The input signal 624 can be any sound generated near the speech training system 602 by the user 622 such that the input signal 624 can be received by the feature extractor 608. Non-limiting examples of the input signal 624 include human speech and human emotions (e.g., laughing, crying, etc.).

The feature extractor 608 is configured to receive the input signal 624 and differentiate between the sounds received. For example, the feature extractor 608 may receive speech sound signals corresponding to different letters of the alphabet. The feature extractor 608 determines which speech sound signal corresponds to which letter and provides the speech sound signals to the speech decoder 610 for further analysis. The feature extractor 608 accomplishes this by using any known technique to convert sound waves to the corresponding digital representations. Non-limiting examples of such techniques include mel-frequency cepstral coefficients (MFCC), wavelet, perceptual linear prediction (PLP), etc.

The speech decoder 610 is configured to receive the speech sound signals from the feature extractor 608 and determine the sounds represented by the speech sound signals. The speech decoder 610 accomplishes this by comparing the speech sound signals to known language models (e.g., English, Spanish, Russian, etc.) to determine the sounds most likely represented by the speech sound signals. Additionally, the speech decoder 610 may include other analysis such as an accent analysis to determine the sounds most likely represented by the speech sound signals. For example, the speech sound signals may indicate that the speaker is speaking English, however the speaker is speaking with an Irish accent. The speech decoder 610 can differentiate between accents within the same language to determine the sounds most likely represented by the speech sound signals.

The speech comparator 614 is configured to receive the decoded speech sound signals from the speech decoder 610 and compare the decoded speech sound signals to known speech sound signals (e.g., model speech signals). The speech comparator 614 may include a database of known speech sound signals (e.g., vowels sound signals, word sound signals, etc.) for different languages, accents, lexicons, etc. such that the decoded speech sound signals can be compared to the known sounds signals to determine whether the decoded speech sound signals are substantially similar (e.g., within 20% of a perfect match) to the known sound signals.

The speech correction planner 616 is configured to receive the comparison of the decoded speech sound signals and the known speech sound signals from the speech comparator 614. If the decoded speech sound signals are not substantially similar to the known sound signals, the speech correction planner 616 is further configured to determine steps the user must take to make the decoded speech sound signals substantially similar to the known sound signals. The speech correction planner 616 then provides the required steps (e.g., the correction plan) to the speech correction facilitator 618.

The speech correction facilitator 618 is configured to receive the correction plan from the speech correction planner 616 and assure the correction plan is in the proper format for the user device 620 to receive the correction plan. The user device may be any device capable of receiving the correction plan from the speech correction facilitator 618 and communicating the correction plan to the user 622. Non-limiting examples of the user device 620 include a desktop computer, a laptop computer, a tablet computer, a mobile device (e.g., a mobile phone, a smartwatch), a smart television, etc. The displays of the speech correction planner 616 are described in greater detail below with respect to FIGS. 8-12.

Figure 7:
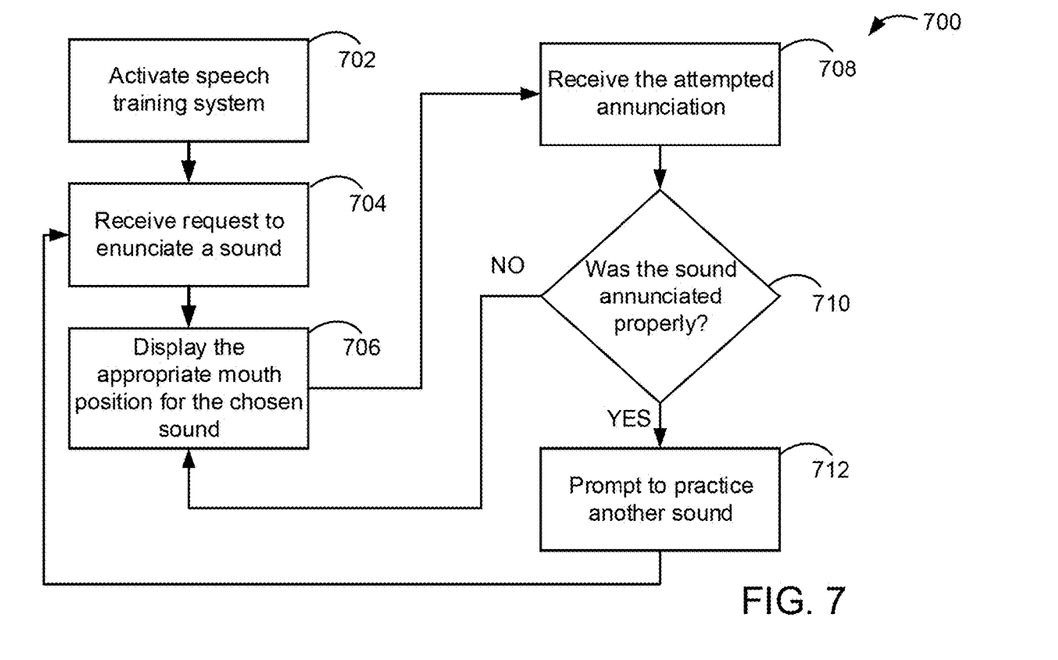
FIG. 7 is a flow diagram of a method of training a hearing impaired person to use proper enunciation, according to a particular embodiment.

FIG. 7 is a flow diagram of a method 700 of training a hearing impaired person to use proper enunciation, according to a particular embodiment. The method 700 can be carried out, in part, by the processor 604.

At 702, the speech training system 602 is activated. For example, in one embodiment the speech training system 602 may be an application loaded on to the user device 620. The user 622 activates the speech training system 602 by selecting the icon for the speech training system 602. In other embodiments, the speech training system 602 is a standalone system that the user turns on or activates and communicates with the user 622 without the user device 620.

At 704, a request to enunciate a sound is received. For example, the user 622 communicates a desire to enunciate a specific sound to the speech training system 602 by interacting with the speech training system 602. In one embodiment, the user 622 selects an icon on the screen of the user device 620 to notify the speech training system 602 of the desire to enunciate a sound.

At 706, the appropriate mouth position for the selected sound is shown. For example, the user 622 may desire to enunciate a specific letter and select the specific letter as described above. The speech training system 602 then provides the user 622 with an image of the proper mouth positioning to correctly enunciate the sound. As described herein, "mouth position" refers to the position of the lips, tongue, jaw, other elements of the oral cavity, larynx, the nasal cavity, the intensity of inhalation and exhalation, the emphasis on words, the time-duration of words and all of the voluntarily controlled elements involved in the production of sound separately or in combination.

At 708, the attempted enunciation is received. For example, after viewing the proper mouth position, the user 622 is prompted to enunciate the sound. The user 622 attempts to imitate the proper mouth position and enunciate the sound, and the attempt is received by the feature extractor 608 as the input signal 624. The feature extractor 608 extracts the relevant sound signal and provides the sound signal to the speech decoder 610 to decode the sound signal, as described.

At 710, a determination is made regarding the proper enunciation of the sound. For example, the decoded sound signal is sent from the speech decoder 610 to the speech comparator 614. The speech comparator 614 compares the decoded sound signal to the known sound signal to determine whether the decoded sound signal is substantially similar to the known sound signal. Determining substantial similarity to the known sound signal can include whether the enunciation is substantially similar to the known sound signal (e.g., within 20% of a perfect match) and/or whether the timing (e.g., speaking cadence) is substantially similar to the known sound signal (e.g., within 20 of a perfect match). If the decoded sound signal is substantially similar to the known sound signal at 710, the attempt is a success and the user 622 is notified and is prompted to practice another sound at block 712. If the decoded sound signal is not substantially similar to the known sound signal at 710, the speech correction planner 616 provides the proper mouth position to the speech correction facilitator 618, and the proper mouth position is provided to the user 622 to view before attempting to enunciate the sound again.

Figure 8:
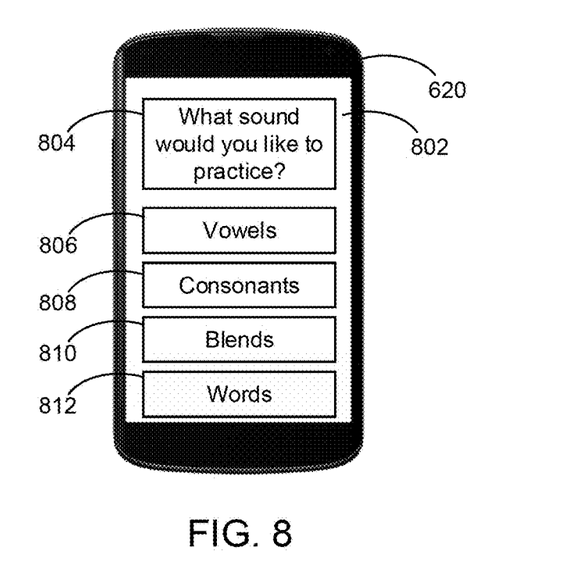
FIG. 8 is an illustration of a user interface of the communication system of FIG. 6 prompting a user to select a category of sound to practice, according to a particular embodiment.

FIG. 8 is an illustration of a user interface of the speech training system 602 of FIG. 6 prompting a user to select a category of sound to practice, according to a particular embodiment. As shown, the user device 620 includes a display 802. The display 802 includes a prompt 804 and buttons 806-812. In some embodiments, upon initiating the speech training system 602, the prompt 804 and buttons 806-812 will be displayed. In other embodiments, prior to providing the prompt 804 the speech training system will provide the user 622 the ability to select the language in which to provide instruction (e.g., English, Spanish, etc.). The user 622 then determines which sound to practice by selecting one of the buttons 806-812. The user can select to practice vowel sounds (e.g., "a," "e," "i," "o," "u") by selecting the button 806. The user can select to practice consonant sounds (e.g., "b," "c," "d,", etc.) by selecting the button 810. The user can select to practice blend sounds (e.g., "ch," "th," "fl," etc.) by selecting the button 810. The user can select to practice words sounds (e.g., "the," "for," "how," etc.) by selecting the button 812. Once selected, a method similar to the method 700 of FIG. 7 may be implemented.

Figure 9:
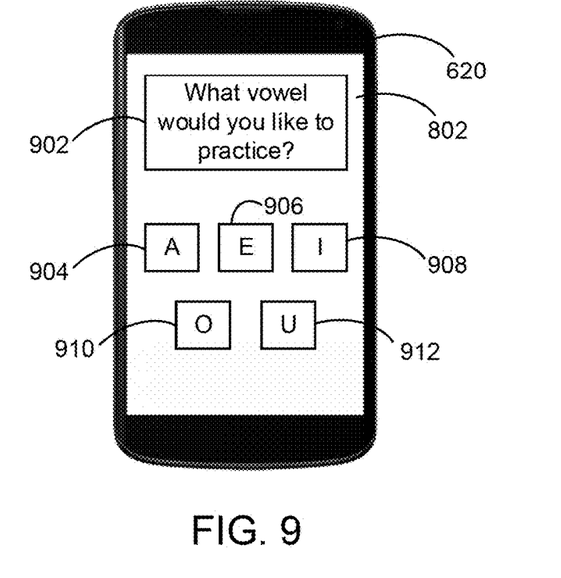
FIG. 9 is an illustration of a user interface of the communication system of FIG. 6 prompting a user to select a specific sound to practice, according to a particular embodiment.

FIG. 9 is an illustration of a user interface of the speech training system 602 of FIG. 6 prompting a user to select a specific sound to practice. As shown, the display 802 includes a prompt 902 and buttons 904-912. In some embodiments, the user 622 may choose to practice vowel sounds and be prompted by the prompt 902 to select the vowel sound to practice. The user 622 can choose to practice a specific vowel by selecting one of the buttons 904-912 that corresponds to the desired vowel. For example, if the user 622 desires to practice the vowel sound "a," the user 622 selects the button 904.

Figure 10:
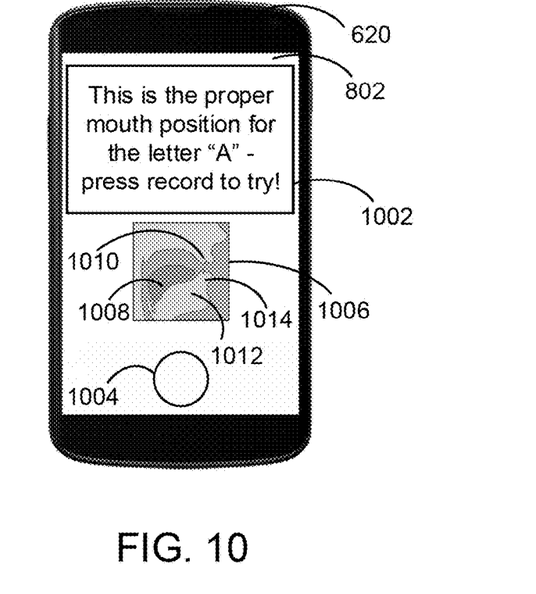
FIG. 10 is an illustration of a user interface of the communication system of FIG. 6 communicating the proper tongue placement the selected sound, according to a particular embodiment.

FIG. 10 is an illustration of a user interface of the speech training system 602 of FIG. 6 communicating the proper mouth position of the selected sound. As shown, the display 802 includes a prompt 1002, an image 1006, and a record button 1004. The image 1006 includes a tongue 1008, a jaw 1012, an upper lip 1010, and a lower lip 1014. In some embodiments, after selecting the desired sound to practice, the user 622 will be prompted by the prompt 1002 to attempt to make the sound. Before attempting to make the sound, the user examines the image 1006, which indicates the appropriate placement of the tongue 1008, the jaw 1012, the upper lip 1010, and the lower lip 1014 to successfully make the sound. After studying the image 1006, the user 622 presses the record button 1004 such that the sound of the user 622 attempting to make the sound is recorded as the input signal 624. After pressing the record button 1004, the user 622 attempts to make the sound, and then presses the record button 1004 again to stop recording. The recorded sound is provided to the feature extractor 608 as the input signal 624 such that the feature extractor can provide the speech signal to the speech decoder 610, as described above.

In some embodiments, the image 1006 can be a video indicating the length of time the user should maintain the mouth position. For example, the user may not know the typical duration of the "a" sound. A video can instruct the user to hold the mouth position for the "a" sound for a specific duration to create the appropriate sound. Additionally, the "a" sound can be further divided in to "long a," "short a," etc., to capture the difference in length between those sounds.

Figure 11:
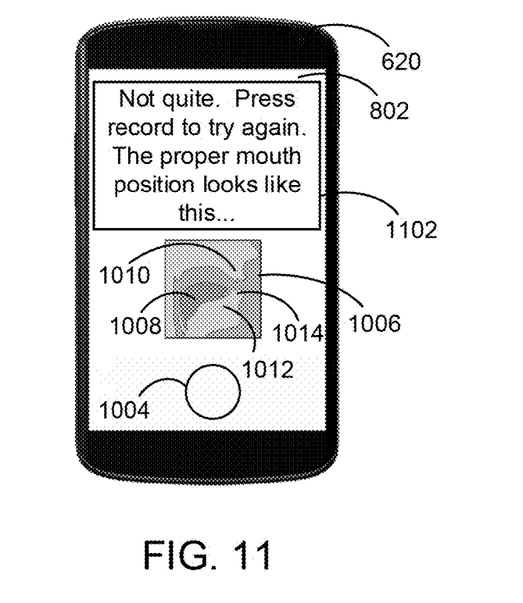
FIG. 11 is an illustration of a user interface of the communication system of FIG. 6 communicating a correction to a user, according to a particular embodiment.

FIG. 11 is an illustration of a user interface of the speech training system 602 of FIG. 6 communicating a correction to a user. As shown, the display 802 includes a prompt 1102, the image 1006, and the record button 1004. In some embodiments, after the user 622 records the attempt to make the desired sound, the speech comparator 614 determines that the sound recorded by the user 622 is not substantially similar to the known sound. Accordingly, the speech correction planner 616 and the speech correction facilitator 618 provide the user 622 with the image 1006 to show the proper mouth position to make the desired sound. In some embodiments, the user 622 is provided with additional images corresponding to the mouth position of the user 622 as the user enunciated incorrectly such that the user 622 can compare the mouth position of the incorrect enunciation to the mouth position for the correct enunciation. The user 622 is notified by the prompt 1102 that the recorded sound is not substantially similar to the known sound, and that another attempt to record the sound should be made. In some implementations, the additional images can be combined with specific instructions as to how to correct the sound. For example, the speech correction facilitator 618 can provide the user with images comparing the mouth position of the user 622 to the proper mouth position, and provide instructions such as "your tongue was positioned too far toward your throat, please move your tongue forward as shown and try again." After studying the proper placement of the tongue 1008, the jaw 1012, the upper lip 1010, and the lower lip 1014, the user 622 again presses the record button 1004 such that the attempt to make the desired sound recorded and is provided to the feature extractor 608 as the input signal 624. This process continues until the user 622 can produce the correct sound. In some embodiments, the user 622 may need to practice a sound many times before perfecting the sound. In such embodiments, the speech correction facilitator 618 may provide assistance to the user 622 graphically to show the progression of the user 622. For example, a graph may show the distance between the proper tongue placement and the actual tongue placement by the user 622. The user 622 can refer to the graph and make corrections for the next attempt, and the speech correction facilitator 618 would update the graph to show both attempts compared with the proper tongue placement. The user 622 can see how much to move the tongue by viewing the graph after making slight modifications. The user 622 can then iteratively practice the sound until the tongue placement of the user 622 matches the proper tongue placement as shown by the speech correction facilitator 618.

Figure 12:
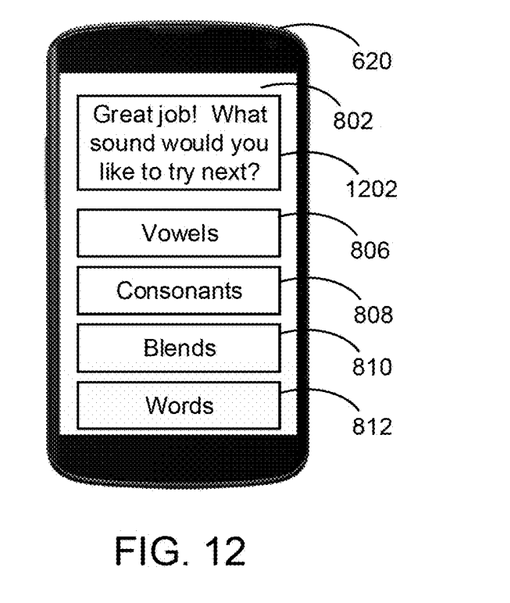
FIG. 12 is an illustration of a user interface of the communication system of FIG. 6 prompting a user to select another category of sound to practice after mastering the previous sound, according to a particular embodiment.

FIG. 12 is an illustration of a user interface of the speech training system 602 of FIG. 6 prompting a user to select another category of sound to practice after mastering the previous sound, according to a particular embodiment. As shown, the display 802 includes a prompt 1202 and the buttons 806-812. In some embodiments, after the user 622 records the attempt to make the desired sound, the speech comparator 614 determines that the sound recorded by the user 622 is substantially similar to the known sound and that the user 622 has mastered the sound. Accordingly, the speech training system 602 provides the user 622 with the prompt 1202 notifying the user 622 that the attempt to make the desired sound was successful. The prompt 1202 provides the user 622 the ability to continue practicing other sounds, and the user 622 can choose any of the buttons 806-812 to practice a new sound.

Though the speech training system 602 is described in the context of teaching a hearing impaired person how to speak, the speech training system 602 can also teach a hearing impaired person how to express emotions in one embodiment. Just as each combination of positions of the tongue, lips, jaw, and teeth creates a unique cavity to produce a unique sound when speaking, different combinations produce unique sounds when expressing emotions (e.g., laughing, crying, screaming, etc.). For example, the speech training system 602 can teach a hearing impaired person to laugh the way a hearing person would laugh by showing the hearing impaired person the proper mouth position on the display 802.

In another embodiment, the speech training system 602 can be used to teach a hearing person how to properly speak a foreign language. For example, a hearing person learning to speak Spanish can be shown the proper mouth position by the speech training system 602 to produce the "rolling r" sound. As another example, a hearing person learning to speak French can be shown the proper mouth position by the speech training system 602 to produce the "throaty r" sound.

Hearing Impaired Communication

The system and method described above can be used to facilitate communication between a hearing person and a hearing impaired person, or between two hearing impaired persons. For example, to facilitate communication between a hearing person and a hearing impaired person without the use of sign language, lip reading, etc., the hearing impaired person incorporates both the haptic output device 202 and the speech training system 602. The hearing impaired person learns to properly enunciate letters, sounds, and words using the speech training system 602 as described. Furthermore, the hearing impaired person learns how to interpret haptic sensations from the haptic output device 202 as language. Accordingly, when a hearing impaired person attempts to communicate with a hearing person, previous difficulties with communication are overcome. For example, a hearing person may see the hearing impaired person and greet the hearing impaired person by saying, "hello, how are you?" The haptic output device 202 receives the input signal and provides haptic sensations to the hearing impaired person that correspond to the greeting, as described above. The hearing impaired person interprets the haptic sensations and understands what the hearing person said. The hearing impaired person is able to respond by speaking because the speech training system 602 taught the hearing impaired person how to properly enunciate words for effective communication. The hearing person understands the hearing impaired person and the two can continue their conversation accordingly.

Non-Speech Sounds

Referring back to FIG. 2, in some embodiments, the user 222 may store instructions on the memory 206 pertaining to specific non-speech sounds unique to the environment of the user 222 (e.g., a school bell, a manufacturing machine, an alarm ring, etc.) represented by user specific sound signals. For example, the user 222 may work in a factory where certain manufacturing machines have particular alarms or bells that may be critical for the user 222 to identify. The user 222 may add the user specific sound signals to the memory 206 such that a haptic feedback identifying these sounds is generated. For example, the haptic output device 202 may connect to an application on a user device (e.g., smart phone, tablet, mobile phone, etc.). The user 222 can use the user device to instruct the haptic output device to assign a "word" to the specific non-speech sounds unique to the environment of the user 222. The user 222 may repeat assigning a "word" for the various types of specific non-speech sounds unique to the environment. The memory 206 can store the assigned "words." The input signal 220 includes the sounds specific to the user's environment (e.g., a school bell, a manufacturing machine, an alarm ring, etc.) and the feature extractor 208 is configured to receive the input signal 220 and differentiate between the sounds received. For example, the feature extractor 208 may receive a combination of sounds including human speech, alarms on a machine, and the operation of other machines.

The feature extractor 208 identifies associated sounds and provides the sound signals to the speech decoder 210 for further analysis. In some embodiments, the feature extractor 208 provides only non-speech sounds to the speech decoder 210. In other embodiments, the feature extractor 208 provides all sounds to the speech decoder 210 in different categories (e.g., human speech, traffic sounds, sounds specific to a user's environment or other identifier categories, etc.).

In some embodiments, the speech decoder 210 is configured to receive the sound signals from the feature extractor 208 and determine what the sound signals represent. For example, the speech decoder 210 can determine the sounds specific to the environment of the user represented by the user specific sound signals. The speech decoder 210 identifies and decodes the source and type of the sound signals by comparing the sounds signals to known sound models that are stored on the memory 206. For example, the user specific sound signals are compared to sound models that were provided by the user 222 and stored on the memory 206 to determine the sounds most likely represented by the user specific sound signal. In some embodiments, the speech decoder 210 may not be able to compare the sound signals because the memory 206 may not have the sound signal. The decoded sounds can be transmitted to the memory 206 via the processor 204 such that the decoded sounds are stored on the memory 206.

In some embodiments, the haptic encoder 214 is configured to receive the decoded sounds from the speech decoder 210 and encode the decoded sounds using the haptic algorithm. In one embodiment, the decoded sounds can be encoded by the haptic encoder 214 using a system similar to ASCII but with fewer bits than the ASCII system (which provides for 128 characters), as the ASCII system accounts for capital letters and other control characters that can be omitted. For example, an alarm on a machine specific to the user's environment may be encoded as a specific combination of letters or letters and numbers (e.g., "bghwia") that are meaningless to a hearing person. When a hearing impaired person perceives the "word" for the alarm on a machine (e.g., "bghwia") represented by haptic sensations, the hearing impaired person knows to follow protocol that is established when the alarm on the machine is activated. Additionally, various sounds specific to the users environment can be encoded in a similar fashion such that a hearing impaired person can fully perceive his or her surroundings. In some embodiments, the haptic encoder 214 may generate a reset code such that in systems using fewer bits, certain combination of bits may be reused and include various meanings. For example, the haptic encoder 214 may generate a reset code of "11111". The haptic encoder 214 encodes a first word (e.g. theater, train, etc.) or "word" (e.g. bghwia) and provides the encoded first word or "word" to the user, as described herein. The haptic encoder 214 then provides the user with the reset code and then provides the user with a second word using the same encoding as the first word. By providing the user the reset code between the first word or "word" and the second word or "word", a user may become aware that the second word or "word" has a different meaning than the first word or "word". The encoded combination of letters pertaining to the sound signal can be transmitted to the memory 206 via the processor 204 for storage. In this manner, the user 222 may develop a database of the user specific sound signals which are stored on the memory 206. In some embodiments, the user 222 may operate the haptic output device 202 (e.g., via a mobile application run on a device of the user 222) to retrieve the stored data on the memory 206. For example, the user 222 may operate the haptic output device 202 such that the processor 204 retrieves the stored sound signal from the memory 206 and provides the sound signal to the user 222

(e.g., via a mobile application run on a device of the user 222) such that the user may replay the sound signal.

The haptic output signal generator 216 is configured to receive the encoded sounds and create a haptic output signal based on the encoded sounds to be sent to the actuator 218. The actuator 218 is configured to receive the haptic output signal from the haptic output signal generator 216 and provide haptic sensations to a user 222. The actuator 218 can be a wide variety of devices or systems that can provide a haptic sensation. In some embodiments, the haptic sensation is a vibratory sensation. In other embodiments, the haptic sensation is an electrical sensation (e.g., a very low voltage).

As described herein, the user is trained to understand the haptic code pertaining to the non-speech sounds such that the user can learn how to interpret the haptic sensation provided by the haptic output device 202

Determining Sound Location

In some embodiments, the communication system 200 is configured to determine a physical property of the sound such as the source of the sound. The feature extractor 208 of the communication system 200 includes at least one microphone to receive the input signal 220. In some embodiments, the feature extractor 208 includes a plurality of microphones spaced at least 1 cm apart. The input signal 220 can be received by the microphone on the feature extractor 208. The feature extractor 208 may differentiate the sound and provides the sound to the speech decoder 210. The speech decoder 210 is configured to calculate location data 212, including the radial distance of the sound signal from the source to the user, the azimuthal angle of the sound from the user, and the polar angle from the user. In some embodiments, the speech decoder 210 calculates distances and angles using a known method of triangulation based on the separation of the plurality of microphones. The radial distance is defined by the distance between the user and the source of the sound. The azimuthal angle is defined by the angle the user would have to turn their head in a horizontal direction. The azimuthal angle is between 0° and 360°. The polar angle is defined by the angle the user would have to move their head in a vertical direction. The polar angle is between 0° and 180°. For example, if a user is facing in a first direction and the sound signal is coming from a second direction directly behind the first direction, the speech decoder 210 can determine that the location of the sound is a radial distance (e.g. 5 feet, 15 feet, 20 feet, etc.) from the user 222, determine that the sound is coming from an azimuthal angle (e.g. 180°) from the user 222, and determine that the sound is coming from a polar angle (e.g. 5°, 10°, 20°, etc.) from the user 222. The calculated location data 212 can be stored on the memory 206 such that the processor 204 may retrieve the calculated location data 212 when prompted by the user 222 (e.g., via a mobile application run on a device of the user 222). In some embodiments, the haptic encoder 214 receives the location data 212 from the speech decoder 210. The haptic encoder 214 is configured to receive the location data 212 and encode the location using a haptic algorithm, as described herein.

The haptic output signal generator 216 is configured to receive the encoded location and create a haptic output signal based on the encoded location to be sent to the actuator. For example, the haptic output signal generator 216 may receive an encoded location of a radial distance of 5 feet, an azimuthal angle of 285°, and a polar angle of 15° and may create at least three haptic output signals, each signal corresponding to one of the radial distance, the azimuthal angle, and the polar angle. The actuator 218 can receive the haptic output signals from haptic output signal generator 216 and can deliver a haptic sensation based on the haptic output signal to the user such that the user knows to turn their body and/or head so that they can identify the source of the sound.

As described herein, the user is trained to understand the haptic code pertaining to the location such that the user can learn how to interpret the haptic sensation provided by the haptic output device 202.

Determining Sound Intensity

In some embodiments, the communication system 200 can determine a physical property of the sound such as the intensity of the sound signal. The communication system 200 is configured to determine the intensity of the sound at the source of the sound signal. For example, the combination of sounds can be received by the feature extractor 208. The feature extractor 208 can differentiate from the sounds and identify the associated sounds and provide the sound signals to the speech decoder 210. The speech decoder 210 can calculate the intensity of the sound. Specifically, the speech decoder 210 can determine the change in the pressure amplitude of the sound signal between the source and the microphone to calculate the intensity of the sound signal at the source. The change in pressure amplitude can occur due to various factors such as density of the environment in which the sound signal is traveling (e.g. air, water, etc.) and/or obstructions in the environment which may affect the path of the sound signal. In some embodiments, the sound intensity determined by the speech decoder 210 is stored on the memory 206 such that the processor 204 may retrieve the sound intensity.

In some embodiments, the speech decoder 210 can calculate the intensity of the sound at the microphone. The sounds can be received by the microphone on the feature extractor 208 and the sound signals can provided to the speech decoder 210. The speech decoder 210 can determine the pressure amplitude of the sound signal received by the microphone and can calculate the intensity of the sound based on the pressure amplitude. The intensity of the sound can be calculated as a numerical value in decibel (dBHL). In some embodiments, the user 222 may determine whether to calculate the intensity of sound at the microphone or at the source of the sound signal. For example, the user 222 may operate the haptic output device 202 (e.g., via a mobile application run on a device of the user 222) such that the intensity of sound at the source is being calculated.

The haptic encoder 214 is configured to receive the intensity of the sound signal and encode the intensity of the sound signal. In one embodiment, then intensity of the sound signal can be encoded using the ASCII system. For example, the intensity of the sound signal may be calculated as being 65 dBHL. The number 65 is represented by the binary number "100001." In some embodiments, the haptic encoder 214 can encode the intensity of the sound signal using a similar system but with fewer bits than the ASCII system. In some embodiments, the intensity of the sound signal is stored on the memory 206 such that the intensity of the sound signal is retrievable by the user 222, as described herein.

The haptic output signal generator 216 is configured to receive the encoded intensity of the sound signal and create a haptic output signal to be sent to the actuator 218. The actuator 218 is configured to receive the haptic output signal and deliver a haptic sensation to the user 222 such that the user 222 would understand that intensity of the sound signal.

As described herein, the user is trained to understand the haptic code pertaining to the sound intensity such that the user can learn how to interpret the haptic sensation provided by the haptic output device 202.

Determining a Bend in the Sound Signal

In some embodiments, the communication system 200 is configured to determine the location of a sound signal originating from beyond a barrier (e.g., a wall, a closed door, etc.). The feature extractor 208 is configured to receive an input signal 220. The input signal 220 may originate from beyond a barrier. For example, a sound generated behind a closed door can bend around the door to reach to the user 222. The feature extractor 208 can receive the input signal 220, differentiate the sounds and identify the associated sounds. The feature extractor 208 can provide the speech decoder 210 with sound signals based on the associate sounds for further analysis. The speech decoder 210 can determine the location of the bend of the sound. Specifically, the feature extractor 208 can receive the input signal 220, differentiate the sounds and identify the associated sounds to provide the sound signals of an associated sound to the speech decoder 210. The speech decoder 210 can receive the sound signals and calculate the radial distance, the polar angle, and the azimuthal angle of the sound at the location of the bend. The calculated location data 212 of the sound signal bending may be stored on the memory 206 such that the processor 204 may retrieve the calculated data. The calculated location is provided by the speech decoder 210 to the haptic encoder 214. The haptic encoder 214 is configured to encode the calculated location data 212 of the bend. In some embodiments, the location of bend is stored on the memory 206 such that the location of the bend is retrievable by the user 222, as described herein. The haptic output signal generator 216 can receive the encoded location and create the haptic output signal. The haptic output signal can be received by the actuator 218 via the haptic output signal generator 216. The actuator 218 can provide haptic sensations based on the haptic output signal to the user 222 to orient the user 222 such that the user 222 may determine where the sound signal is bending. In some embodiments, after the user 222 is able to determine the location of the signal bend and arrives at the location, the feature extractor 208 receives the input signal 220 and through the actuator 218 provides the location of the origin of the input signal 220.

In some embodiments, the user 222 can use the haptic output device 202 to learn how to identify the source of the sound signal. For example, the user 222 can receive haptic sensations relating to the location of the sound signal bending which can allow the user 222 to orient themselves towards the bend of the sound signal. As the user 222 moves to identify the origin of the sound signal, the feature extractor 208 can receive the sounds, determine the associated sounds, and provide the sound signals to the associated sounds to the speech decoder 210. The speech decoder 210 can calculate the location of the sound signal with respect to the user's new location from the sound signals. In some embodiments, the speech decoder 210 calculates the location of the bend of the sound signal, as described herein. In some embodiments, the speech decoder 210 calculates the origin of the sound signal if there is no barrier causing the sound signal to bend, as described herein. The location of the sound signals can be encoded by the haptic encoded 114 and can be received haptic output signal generator 216 so that the haptic output signal generator 216 can create the haptic output signal. The actuator 218 can receive the haptic output signal pertaining to the encoded location of the sound signals and can provide the haptic sensations corresponding with the location with respect to the user 222. This facilitates the user 222 to track and identify the source of the sound signal when the sound signal bends.

Select Speech in a Crowded Environment

In some embodiments, communication system 200 is configured to receive the input signal 220 and differentiate between sounds received in a crowded environment. For example, the feature extractor 208 can receive a combination of sounds including a plurality of human speech from a plurality of humans and various non-human and/or non-speech sounds such as musical notes. From the combination of sounds received, the feature extractor 208 can differentiate between the sounds received and identify the sound of a key individual (e.g., an individual associated with the user such as a friend, family member, work colleague, etc.). For example, the user 222 may be at a party, a concert, or a live event where the sound signal from a key individual is of importance. The feature extractor 208 can differentiate the sound of the human speech of a key individual by analyzing the sound characteristics from the sound signal. The sound characteristics from the sound signal may be frequency, pitch, intensity, etc., which make the sound characteristics of the key individual different from another individual. In some embodiments, the feature extractor 208 may compare the sound characteristics of the sound signal of a key individual to known models stored on the memory 206. For example, the memory 206 may include models pertaining to the key individual or the user 222 may train the haptic output device 202 to learn the sound characteristics of the key individual (e.g., via a mobile application run on a device of the user 222). In some embodiments, the memory may include models, such that the user 222 may access them and replay them, as described herein. In some embodiments, the user 222 may train the haptic output device 202 through the use of training aids (e.g. videos, recordings, etc.). The user 222 may play a training aid such that sound signal from the training aid is received by the feature extractor 208. In some embodiments, the sound characteristics of the sound signal are transmitted to the memory 206 via the processor 204 to be stored such that the sound characteristics may be utilized as a model.

Once the feature extractor 208 determines the sound signal from the key individual, the feature extractor can provide the speech decoder 210 the sound signals. The speech decoder 210 can receive the sound signals determines what the sound signal represents. For example, the speech decoder 210 can decode the sound signals and determine the words represented by the speech sound signals. The haptic encoder 214 is configured to receive the decoded sounds and encode the decoded haptic words, as described herein. The haptic output signal generator 216 is configured to receive the encoded haptic words and create a haptic output signal based on the encoded haptic words, as described herein. The actuator 218 is configured to receive the haptic output signal from the haptic output signal generator 216 and provide haptic sensations to the user 222.

Intensity of Exhalation, Inhalation, and Inflections of a Third Party

In some embodiments, the communication system 200 can determine the intensity of the exhalation, inhalation, and the inflections of the input signal 220. The feature extractor 208 is configured to receive the input signal 220 and differentiate between the sounds received. For example, feature extractor 208 may receive a combination of sounds including human speech, a dog barking, and a car horn honking. The feature extractor 208 identifies associated sounds and provides the sound signals to the speech decoder 210 for further analysis. The feature extractor 208 may provide only the human speech sounds to the speech decoder 210.

The speech decoder 210 is configured to receive the sound signals from the feature extractor 208 and determine what the sound signals represent. For example, the speech decoder 210 can determine the words represented by the speech sound signals and can determine the intensity of the exhalation, the intensity of the inhalation, and any inflections that the words may have. For example, a third party speaking to the user 222 may say the word "man" with a deep exhalation to express the third party's stress. The feature extractor 208 can receive the sound signal, which includes the word "man" and the deep exhalation, and provide the speech decoder with the sound signal. The speech decoder 210 may decode the sound signal and determine the word "man" and determine that the exhalation is deep such that the exhalation is at a high intensity. In some embodiments, the speech decoder 210 may decode the sound signal such the sound signal includes an intensity of inhalation and words or an inflection and words, or a combination of words, intensity of inhalation, and intensity of exhalation. The haptic encoder 214 is configured to receive the decoded sound and encode the decoded sound using the haptic algorithm. For example, the haptic encoder 214 would encode the word "man" and separately encode the intensity of exhalation, as described herein. In some embodiments, the encoded word and the separately encoded intensity of exhalation, inhalation, or the inflection may be stored on the memory 206, as described herein, such that the user 222 may retrieve the encoded word and the separately encoded intensity of exhalation, inhalation or the inflection to replay. The haptic output signal generator 216 is configured to receive the encoded haptic words and the encoded intensity of exhalation and generate a haptic output signal. The actuator 218 is configured to receive the haptic output signal and provide haptic sensations to the user 222.

As described herein, the user is trained to understand the haptic code pertaining to the words, the intensity of inhalation, the intensity of exhalation, and/or inflections such that the user can learn how to interpret the haptic sensation provided by the haptic output device 202.

Graphical Guidance of Correction

Referring back to FIG. 7, in some embodiments, the method 700 of training a hearing impaired person to use proper enunciation, at 706, the mouth position of the users attempt is shown adjacent to the appropriate mouth position. For example, the speech training system 602 provides the user 622 with an image of the proper mouth positioning to correctly enunciate the sound. In some embodiments, the speech training system 602 provides the image of the proper mouth positioning as a first color (e.g., red, blue, yellow, green, etc.). At 708, the attempted enunciation is received. For example, after viewing the proper mouth position, the user 622 is prompted to enunciate the sound. The user 622 attempts to imitate the proper mouth position and enunciate the sound, and the attempt is received by the feature extractor 608 as the input signal 624. The feature extractor 608 extracts the relevant sound signal and provides the sound signal to the speech decoder 610 to decode the sound signal, as described.

At 710, a determination is made regarding the proper enunciation of the sound. For example, the decoded sound signal is sent from the speech decoder 610 to the speech comparator 614. The speech comparator 614 compares the decoded sound signal to the known sound signal to determine whether the decoded sound signal is substantially similar to the known sound signal. Determining substantial similarity to the known sound signal can include whether the enunciation is substantially similar to the known sound signal (e.g., within 20% of a perfect match) and/or whether the timing (e.g., speaking cadence) is substantially similar to the known sound signal (e.g., within 20 of a perfect match). If the decoded sound signal is substantially similar to the known sound signal at 710, the attempt is a success and the user 622 is notified and is prompted to practice another sound at block 712. If the decoded sound signal is not substantially similar to the known sound signal at 710, the speech correction planner 616 provides the proper mouth position to the speech correction facilitator 618 and provides a model (e.g., video, image, etc.) of the user's attempt to the user interface of the speech training system to the speech correction facilitator 618. For example, the proper mouth position displayed may be the tongue positioned in the center of the roof of the oral cavity. The user's attempt is displayed adjacent to the image of the proper mouth positioning. In some embodiments, the user's attempt may be displayed in a second color different from the first color. For example, the user's attempt may show the tongue positioned on the roof of the oral cavity proximate to the teeth of the user. In some embodiments, the speech correction planner 616 provides the speech correction facilitator 618 more than one of the user's attempts adjacent to image of the proper mouth positioning. Each of the user's attempts may be displayed in a different color.

Once the speech correction facilitator provides the image of the proper mouth position and at least one of the user's attempt to the user device 620, the speech correction facilitator 618 provides the user device 620 with instructions to guide the user. For example, the speech correction facilitator 618 may provide instructions which illustrate on the user device 620 an arrow from the user's attempt to the image of the proper mouth position. The instructions may prepare the user 622 for the next steps to improve their mouth position.

The speech correction facilitator 618 provides the user device 620 a graphical depiction of movement of the mouth position from the user's attempt to the proper mouth position to display. For example, the speech correction planner 616 determines that the user's mouth position needs to be adjusted such that the user's tongue needs to move from the being proximate to the teeth to the middle of the roof of the oral cavity. The speech correction planner 616 provides an animation of the adjustment of the mouth position from the user's attempt to the proper mouth position to the speech correction facilitator 618. The speech correction facilitator 618 provides the animation to the user device 620 to display. For example, the animation of the adjustment of the mouth position may be of the tongue moving from the roof of the oral cavity proximate to the teeth to the middle of the roof of the oral cavity is shown. In some embodiments, the animation of the adjustment of the mouth position is displayed in a third color. In some embodiments, the animation may flash after the adjustment of the mouth position is identical to the image of the proper mouth position to indicate to the user the proper mouth position.

Referring to FIG. 6, the communication system 600, in some embodiments, the speech comparator 614 is configured to determine the accuracy of the attempts and determine the progress of the user 622. The speech comparator 614 is configured to receive the decoded speech sound signals associated with the attempt from the user 622 from the speech decoder 610 and compare the decoded speech sound signals to known speech sound signals. The speech comparator 614 may determine if the decoded speech sound signals are substantially similar (e.g., within 20% of a perfect match) to the known sound signals or substantially different (e.g., within 80% of a perfect match). The speech comparator 614 can determine the accuracy and store the accuracy on the memory 606. In some embodiments, the accuracy is determined and stored for every attempt.

The speech correction planner 616 may retrieve the stored accuracy via the processor 604 and determine the deviation of the attempts. For example, the speech correction planner 616 may determine the number of attempts that were within 30% of a perfect match, the number of attempts within 50% of a perfect match, etc., and generate a depiction (graph, chart, table, etc.). The depiction is provided to the speech correction facilitator 618 to provide to the user device 620 to provide to the user 622.

As utilized herein, the term "substantially," and similar terms are intended to have a broad meaning in harmony with the common and accepted usage by those of ordinary skill in the art to which the subject matter of this disclosure pertains. It should be understood by those of ordinary skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

Although only a few embodiments have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter described herein. For example, elements shown as integrally formed may be constructed of multiple components or elements, the position of elements may be reversed or otherwise varied, and the nature or number of discrete elements or positions may be altered or varied. The order or sequence of any method processes may be varied or re-sequenced according to alternative embodiments. Other substitutions, modifications, changes, and omissions may also be made in the design, operating conditions and arrangement of the various exemplary embodiments without departing from the scope of the present invention.

What is claimed is:

1. A haptic output device for hearing impaired communication comprising:
    one or more memory devices configured to store instructions that, when executed on one or more processors, cause the one or more processors to:
        receive a sound as a sound input;
        determine a physical property of the sound input;
        generate a haptic output signal based on the physical property of the sound input; and
        actuate an actuator, the actuator configured to receive the haptic output signal and provide haptic sensations based on the haptic output signal to a user wearing the haptic output device,
    wherein the physical property of the sound input includes a location of a source of the sound, and
    wherein the haptic output signal includes at least one of a radial distance, an azimuth angle, or a polar angle of the source of the sound.

2. The haptic output device of claim 1, wherein the physical property of the sound input includes an intensity of the sound input.

3. The haptic output device of claim 2, wherein the intensity of the sound input is determined by one or more processors from a characteristic of the sound input.

4. The haptic output device of claim 3, wherein the characteristic of the sound input comprises a frequency of the sound input.

5. The haptic output device of claim 1, wherein the one or more processors encodes a sound output signal with a binary representation of the sound output signal.

\* \* \* \* \*